(12) United States Patent
Caillaud

(10) Patent No.: US 7,711,457 B2
(45) Date of Patent: May 4, 2010

(54) METHOD FOR POSITIONING ORDERS WITH DELAYED EXECUTION IN AN AIRCRAFT FLIGHT PATH

(75) Inventor: Christophe Caillaud, Blagnac (FR)

(73) Assignee: Thales (FR)

( * ) Notice: Subject to any disclaimer, the term of this patent is extended or adjusted under 35 U.S.C. 154(b) by 394 days.

(21) Appl. No.: 11/577,321

(22) PCT Filed: Sep. 22, 2005

(86) PCT No.: PCT/US2005/054744

§ 371 (c)(1),
(2), (4) Date: Apr. 14, 2007

(87) PCT Pub. No.: WO2006/040249

PCT Pub. Date: Apr. 20, 2006

(65) Prior Publication Data

US 2009/0055035 A1 Feb. 26, 2009

(30) Foreign Application Priority Data

Oct. 15, 2004 (FR) .................................. 04 10951

(51) Int. Cl.
*G05D 1/06* (2006.01)
(52) U.S. Cl. .................... 701/5; 701/16; 701/23; 701/120; 701/200; 340/945

(58) Field of Classification Search ................. 701/3–5, 701/9, 11, 16, 23, 24, 120–122, 300, 301, 701/200, 207; 340/943, 945, 961, 963; 342/357.01, 342/357.06, 357.07, 357.09, 357.13
See application file for complete search history.

(56) References Cited

U.S. PATENT DOCUMENTS

| | | | |
|---|---|---|---|
| 6,542,796 B1 | 4/2003 | Gibbs et al. | |
| 6,732,022 B2 * | 5/2004 | Mardirossian | 701/3 |
| 2003/0023354 A1 * | 1/2003 | Brust et al. | 701/3 |
| 2003/0088360 A1 | 5/2003 | Ikhlef et al. | |
| 2004/0267412 A1 | 12/2004 | Arnouse | |

FOREIGN PATENT DOCUMENTS

EP 0 798 685 A 10/1997

\* cited by examiner

*Primary Examiner*—Gertrude Arthur Jeanglaud
(74) *Attorney, Agent, or Firm*—Lowe Hauptman Ham & Berner, LLP

(57) ABSTRACT

The invention relates to a navigation aid method of an aircraft comprising a step for positioning an execution order in a flight plan then in a flight path. When the order is for deferred execution, that is, comprises a condition, estimating the position of the aircraft when the condition associated with the order is satisfied, modifying the flight plan based on the estimated position according to the order, computing a new flight path based on the flight plan.

15 Claims, 3 Drawing Sheets

METHOD FOR POSITIONING ORDERS WITH DELAYED EXECUTION IN AN AIRCRAFT FLIGHT PATH

CROSS-REFERENCE TO RELATED APPLICATIONS

The present Application is based on International Application No. PCT/EP2005/054744, filed on Sep. 22, 2005, which in turn corresponds to French Application No. 04 10951 filed on Oct. 15, 2004, and priority is hereby claimed under 35 USC § 119 based on these applications. Each of these applications are hereby incorporated by reference in their entirety into the present application.

FIELD OF THE INVENTION

The invention relates to a navigation aid for an aircraft and, more particularly, the management of the onboard flight path.

It will be recalled that an aircraft is equipped with a navigation aid system. This exchanges a variety of information with the ground and with other aircraft equipment. It communicates with the aircrew via man-machine interfaces.

BACKGROUND OF THE INVENTION

The navigation aid system assists the crew in programming the flight plan before take-off and in monitoring the path of the flight plan from take-off through to landing. Its assistance in programming the flight plan consists on the one hand in plotting, in the horizontal and vertical planes, a path sketch formed by a succession of waypoints associated with various clearances such as altitude, speed, heading or others, and on the other hand in computing, also in the horizontal and vertical planes, the path that the aircraft will follow to complete its mission.

When preparing the programming of the flight plan, the crew inputs into the navigation aid system, explicitly or implicitly, the geographic coordinates of the waypoints and their associated clearances, and obtains from the navigation aid system a path sketch and a flight path. The path is made up of a chain of segments linking the waypoints two by two from the starting point through to the destination point, and arcs of circle providing the heading transitions between segment at the waypoints. The path sketch and the path are displayed on a navigation screen to enable the crew to check their relevance.

Before take-off, or during the flight, the air traffic control (ATC) authority sends the crew the clearance execution orders, via the navigation aid system. These are confirmations of the clearances scheduled in the flight plan, or changes of clearances.

Some of these orders have no impact on the flight path, such as, for example, an order concerning a change of communication frequency. Others require the flight path to be modified; among these, there are orders with immediate execution and orders with deferred execution.

When an immediate execution order is received by the navigation aid system, the latter modifies the flight plan according to this order and immediately recomputes the new modified flight path, communicates it to the crew and to ATC, and sends the clearance associated with the order to the aircraft guidance device.

A deferred execution order comprises a condition; when the condition is satisfied, the clearance must then be executed.

When a deferred execution order is received by the navigation aid system, the latter monitors the triggering of the condition and, immediately the condition is satisfied, it processes the order as an immediate order: it modifies the flight plan according to this order, recomputes the new flight path, communicates it to the crew and to ATC, and transmits the clearance to the guidance device. However, there is no anticipation: neither ATC nor the crew know the new flight path until it is operational.

The aim of the invention is to overcome this drawback.

The principle of the invention is to estimate where the condition will be satisfied, and to compute, anticipatively, the new flight path modified by the order.

SUMMARY OF THE INVENTION

To achieve this aim, the invention proposes a navigation aid method for an aircraft comprising a step for positioning an execution order in a flight plan then in a flight path, mainly characterized in that when the order is for deferred execution, that is, comprises a condition, it comprises steps consisting in, anticipatively:

estimating the position of the aircraft when the condition associated with the order is satisfied, this position being designated anchor position, modifying the flight plan based on the anchor position according to the order, computing a new flight path based on the modified flight plan.

Inserting the estimated position of the aircraft when the condition is satisfied into the flight path makes it possible to design a complete flight path including all the useful information that the aircraft has received.

According to one characteristic of the invention, the order originating from an air traffic control authority, it also comprises a step consisting in anticipatively communicating the new flight path to the air traffic control authority.

According to another characteristic of the invention, the position estimation, flight plan modification and new path computation steps are repeated periodically and/or on an event.

Another subject of the invention is a navigation aid system for an aircraft linked to a communication interface and equipped with a condition monitor, an order positioner and a path computation device, characterized in that the positioner is for anticipatively estimating a modified flight plan based on a deferred execution order sent by the condition monitor and for transmitting to the path computation device the modified flight plan in order to compute a modified path.

Preferably, the path computation device is for transmitting the modified path to the communication interface.

BRIEF DESCRIPTION OF THE DRAWINGS

Other characteristics and advantages of the invention will become apparent from reading the detailed description that follows, given by way of non-limiting example and with reference to the appended drawings, in which.

DETAILED DESCRIPTION

The onboard management of an order will now be detailed.

In the case of an immediate execution order, the latter is sent from the ground to the aircraft via, for example, a digital link such as the C/P-DLC (Controller/Pilot-Data Link Communication) link. On board, it is first processed by a communication interface; the order is then transmitted to an order interpreter which analyzes the type of the order. The order is, for example, an order with or without impact on the flight path, and among the orders with an impact on the flight path, it will be an immediate or deferred execution order.

Figure 1:
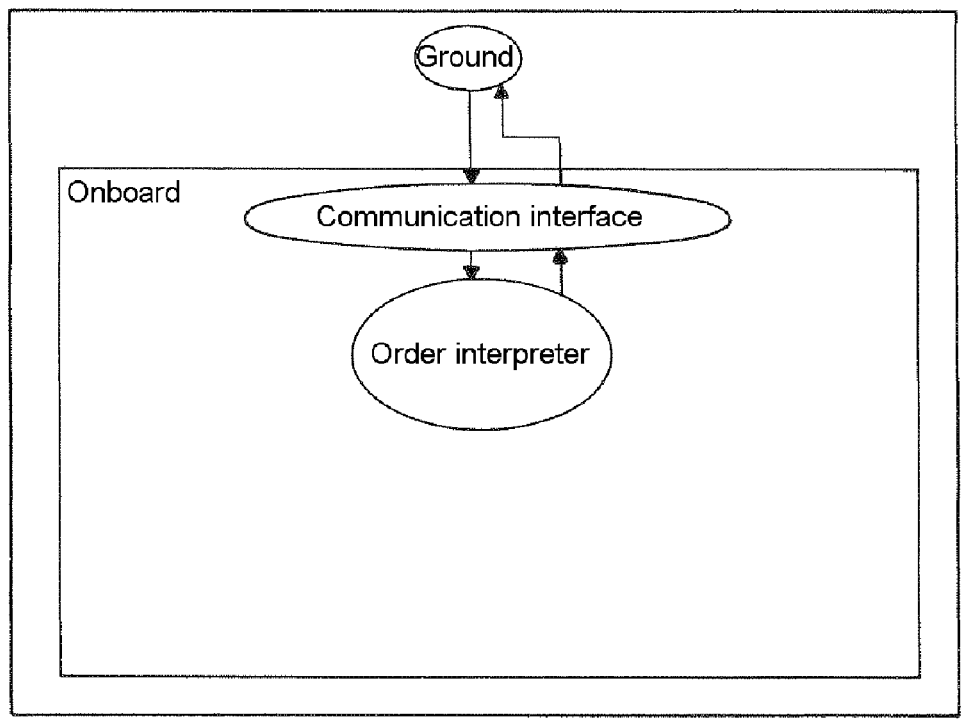
FIG. 1 represents a diagram illustrating the management of an order with no impact on the flight path.

When it is an order with no impact on the flight path (for example, a change of radio frequency), the latter is executed and an execution notice is returned to the ground by the interpreter via the communication interface and the digital link. This case is illustrated in the diagram of FIG. 1.

Figure 2:
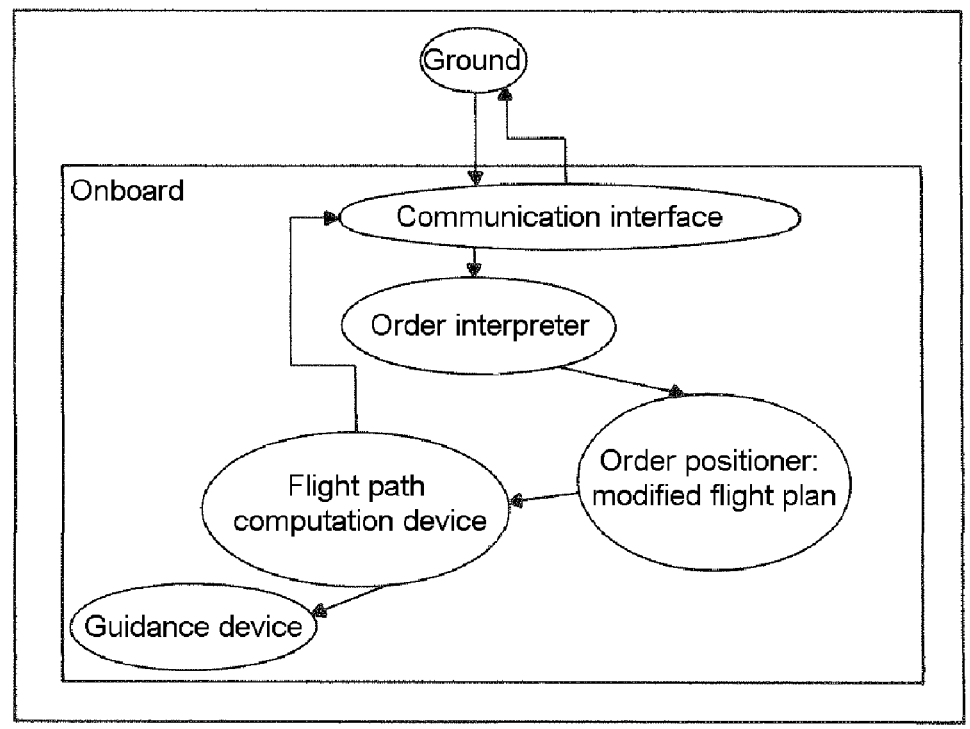
FIG. 2 represents a diagram illustrating the management of an immediate execution order having an impact on the flight path.

When it is an immediate execution order, the interpreter transmits the order in a known way to a positioner which computes the flight plan modified by this order. On explicit action on the part of the crew, this modified flight plan becomes the reference flight plan; the latter is transmitted to the path computation device which computes the new path based on the modified flight plan. This new path becomes the reference path which is transmitted to the aircraft guidance device and to the communication interface for ATC; this path is also transmitted to the crew. This case is illustrated in the diagram of FIG. 2.

When it is a deferred execution order, such as, for example:
"AT FL 100 PROCEED DIRECT TO AGN" which means that the condition concerning the standard altitude of 10 000 feet is reached by the aircraft, the clearance is "direct to Agen", the interpreter transmits the order to a condition monitor.

The monitor on the one hand monitors the triggering of the condition, in this case, monitors the altitude of the aircraft until the 10 000 feet is reached. On the other hand, according to the invention, it asks the positioner to estimate the flight plan modified by this order, that is, to estimate the position of the aircraft when the order is triggered, designated anchor position, in this case the position of the aircraft when it has reached 10 000 feet, and to update the clearances modified according to the order based on this anchor position. The positioner thus anticipatively estimates a new flight plan. This new flight plan or modified flight plan is transmitted to the path computation device in order to compute the corresponding modified path.

Figure 3:
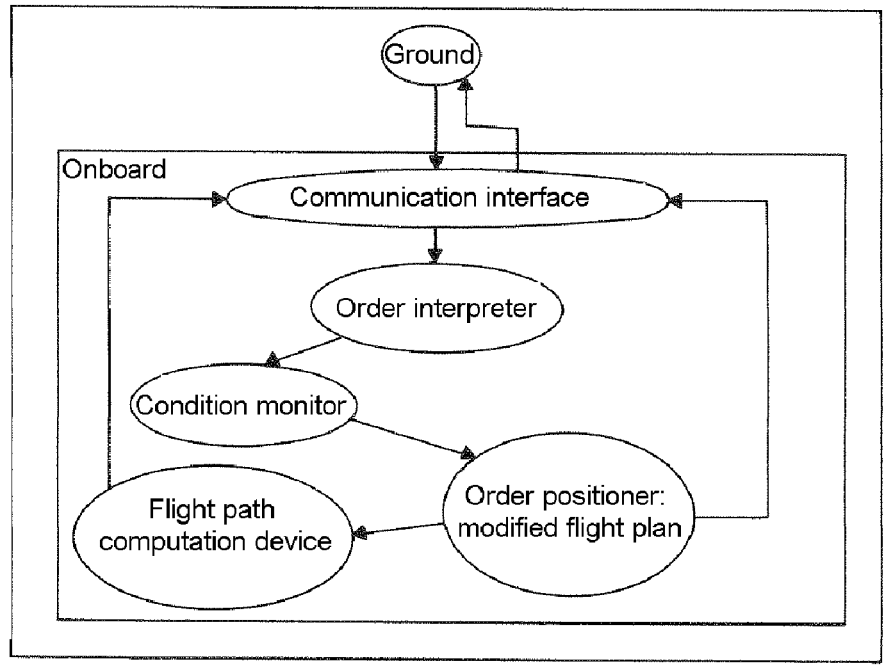
FIG. 3 represents a diagram illustrating the management of a deferred execution order having an impact on the flight path, before the condition is satisfied, FIG. 4 diagrammatically represents a reference flight path and a modified flight path, based on an anchoring position.
Figure 4:
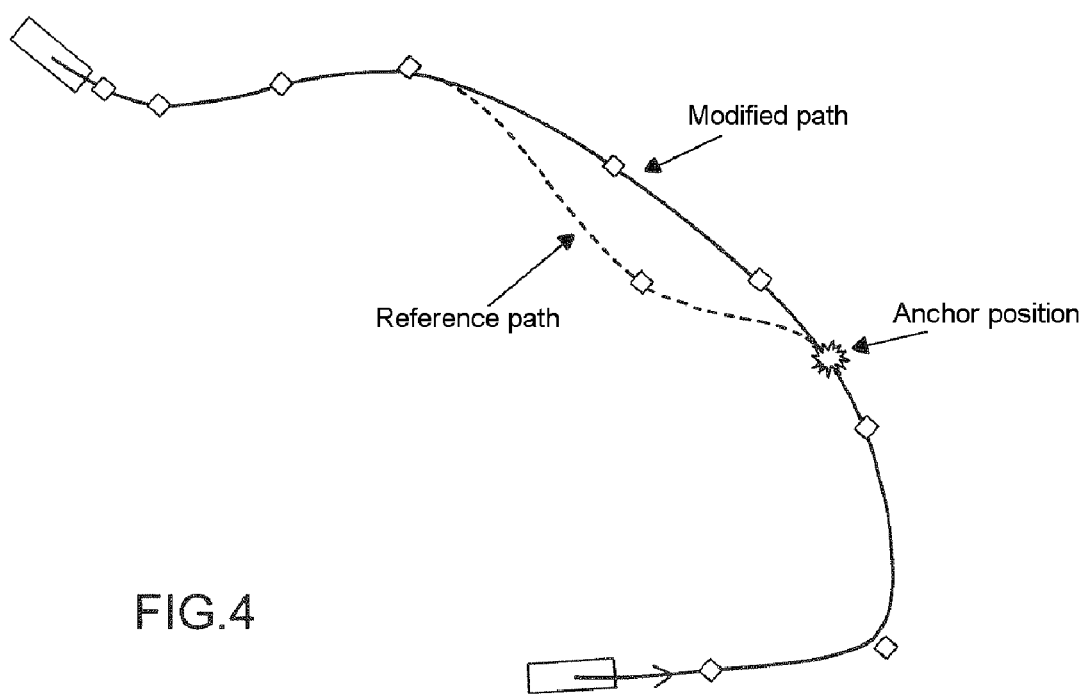

This modified path estimation, illustrated in FIG. 4, is sent to ATC and to the crew as previously. This case is illustrated in the diagram of FIG. 3.

Preferably, the steps for estimating the new flight plan, computing the new path and transmitting to ATC and to the crew, are repeated periodically and/or on an event (gusts of wind, etc.).

Figure 5:
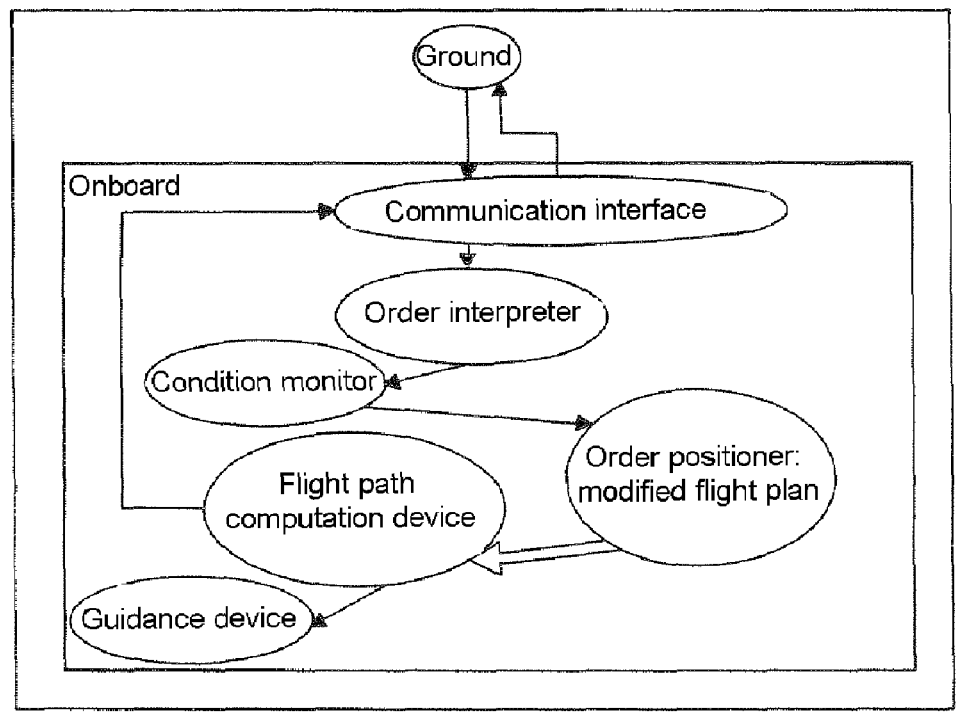
FIG. 5 represents a diagram illustrating the management of a deferred execution order having an impact on the flight path, when the condition is satisfied, FIG. 6 diagrammatically represents a navigation aid system comprising means of implementing the inventive method.

When the condition is satisfied, in this case when the 10 000-foot altitude is reached, the condition monitor asks the positioner to update the modified flight plan then the positioner asks the path computation device to update the modified path. This modified path is activated as reference path by the path computation device, possibly on an explicit action on the part of the crew; this reference path is transmitted to the aircraft guidance device and to the communication interface for ATC. This case is illustrated in the diagram of FIG. 5.

When the condition is never satisfied, the reference path remains valid and is not replaced by the modified path.

An altitude condition has been taken as the exemplary condition. There are also, currently, position and time conditions.

The position condition, known by the expression "altitude marker", amounts to checking that the path does indeed pass through the indicated position and using this position as clearance anchor position.

The time condition, known by the expression "time marker", amounts to estimating the waypoint of the aircraft at the indicated time. This waypoint is used as anchor position.

Other conditions can be introduced, relating for example to:
- the position relative to one or more points belonging or not belonging to the flight path,
- the heading of the aircraft,
- the speed of the aircraft,
- the remaining fuel,
- a weather forecast (wind, temperature, pressure),
- the relative distance to another moving craft, As for the known conditions, the position where the condition is satisfied is the anchor position.

Figure 6:
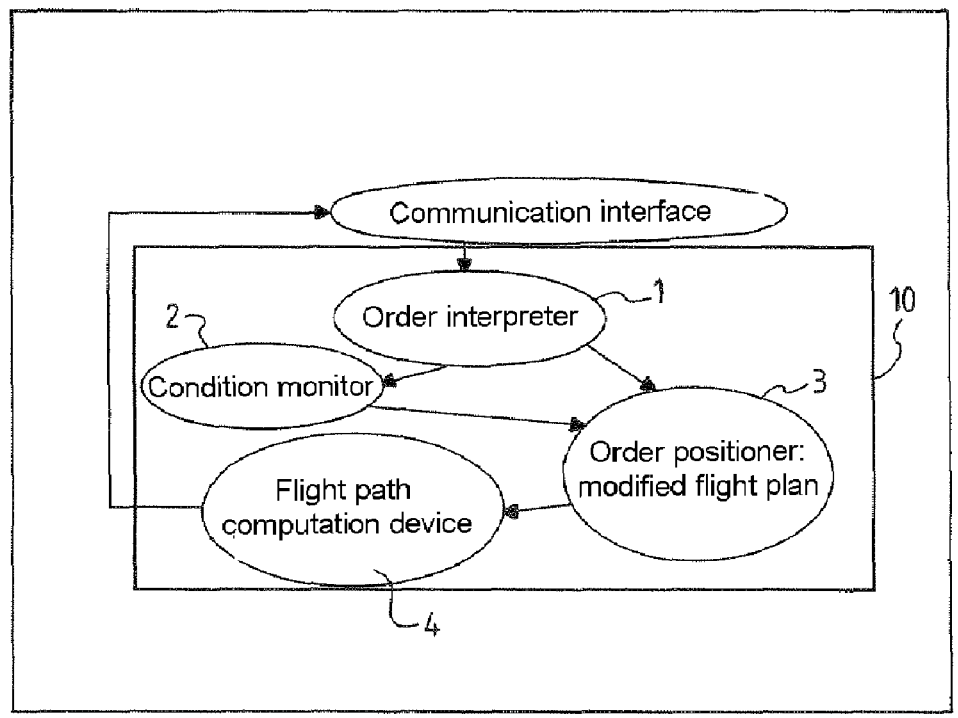

The navigation aid system 10 represented in FIG. 6 is linked to the ground-onboard (or onboard-ATC) communication interface and is provided with the order interpreter 1, the condition monitor 2, the order positioner 3 and the path computation device 4. According to the invention, the positioner 3 is for anticipatively estimating a flight plan modified based on a deferred execution order sent by the condition monitor 2, and transmitting to the path computation device 4 the modified flight plan, in order to compute a modified path.

The path computation device 4 is for transmitting the modified path to the communication interface in order to communicate it to ATC and to a man-machine interface so it can be communicated to the crew.

The invention claimed is:

1. A navigation aid method for an aircraft comprising the steps of:
   positioning an execution order in a flight plan then in a flight path, wherein the order is for deferred execution, a condition comprising the steps of:
   estimating the position of the aircraft when the condition associated with the order is satisfied, this position being designated anchor position,
   modifying the flight plan based on the anchor position according to the order,
   calculating a new flight path based on the modified flight plan.

2. The method as claimed in claim 1, wherein the order is originated from an air traffic control authority, said method further comprising the following step:
   anticipatively communicating the new flight path to the air traffic control authority.

3. The method as claimed in claim 1, wherein the position estimation, flight plan modification and new path computation steps are repeated periodically and/or on an event.

4. The method as claimed in claim 1, wherein the order condition relates to parameters such as the position of the airplane, the altitude of the airplane, the time, or a position relative to one or more points belonging or not belonging to the flight path, or the heading of the aircraft, or the speed of the aircraft, or the remaining fuel, or the wind, or the engine intake temperature, or the atmospheric pressure, or the relative distance to another moving craft.

5. The method as claimed in claim 2, wherein the position estimation, flight plan modification and new path computation steps are repeated periodically and/or on an event.

6. The method as claimed in claim 2, wherein the order condition relates to parameters such as the position of the airplane, the altitude of the airplane, the time, or a position relative to one or more points belonging or not belonging to the flight path, or the heading of the aircraft, or the speed of the aircraft, or the remaining fuel, or the wind, or the engine intake temperature, or the atmospheric pressure, or the relative distance to another moving craft.

7. The method as claimed in claim 3, wherein the order condition relates to parameters such as the position of the airplane, the altitude of the airplane, the time, or a position relative to one or more points belonging or not belonging to the flight path, or the heading of the aircraft, or the speed of the aircraft, or the remaining fuel, or the wind, or the engine intake temperature, or the atmospheric pressure, or the relative distance to another moving craft.

8. A navigation aid system for an aircraft linked to a communication interface and equipped with a condition monitor, an order positioner and a path computation device,
wherein the positioner is for anticipatively estimating a modified flight plan based on a deferred execution order sent by the condition monitor and for transmitting to the path computation device the modified flight plan in order to compute a modified path.

9. The navigation aid system as claimed in claim 8, wherein the path computation device is for transmitting the modified path to the communication interface.

10. The navigation aid system as claimed in claim 8, wherein the condition monitor is for asking the positioner to update the modified flight plan, and the positioner is for asking the path computation device to update the modified path.

11. The navigation aid system as claimed in claim 8, wherein it is linked to a guidance device, and the path computation device is for activating the modified path as reference path and transmitting it to the guidance device.

12. The navigation aid system as claimed in claim 11, wherein the navigation aid system communicates with the aircrew by means of a man-machine interface, and in that the path computation device is controlled by the crew to activate the modified path as reference path and transmit it to the guidance device.

13. The navigation aid system as claimed in claim 9, wherein the condition monitor is for asking the positioner to update the modified flight plan, and the positioner is for asking the path computation device to update the modified path.

14. The navigation aid system as claimed in claim 9, wherein it is linked to a guidance device, and the path computation device is for activating the modified path as reference path and transmitting it to the guidance device.

15. The navigation aid system as claimed in claim 10, where it is linked to a guidance device, and the path computation device is for activating the modified path as reference path and transmitting it to the guidance device.

* * * * *